(12) United States Patent
Takai (10) Patent No.: US 7,775,232 B2
(45) Date of Patent: Aug. 17, 2010

(54) FLOWING-DOWN RAINWATER FILTRATION DEVICE AND RAINWATER STORAGE DEVICE USING THE SAME

(75) Inventor: Seiichiro Takai, Tokyo (JP)

(73) Assignee: Totetu Mfg. Co. Ltd., Tokyo (JP)

( * ) Notice: Subject to any disclaimer, the term of this patent is extended or adjusted under 35 U.S.C. 154(b) by 753 days.

(21) Appl. No.: 11/791,560

(22) PCT Filed: Nov. 1, 2005

(86) PCT No.: PCT/JP2005/020068

§ 371 (c)(1),
(2), (4) Date: May 24, 2007

(87) PCT Pub. No.: WO2006/057137

PCT Pub. Date: Jun. 1, 2006

(65) Prior Publication Data

US 2008/0105306 A1 May 8, 2008

(30) Foreign Application Priority Data

Nov. 25, 2004 (JP) .............................. 2004-339708

(51) Int. Cl.
*E03B 3/02* (2006.01)
(52) U.S. Cl. ..................... 137/122; 137/433; 137/583; 137/360; 137/120; 52/16
(58) Field of Classification Search ................. 137/120, 137/122, 357, 360, 433, 583; 52/16
See application file for complete search history.

(56) References Cited

U.S. PATENT DOCUMENTS 316,184 A * 4/1885 Sancan ........................ 137/122

(Continued)

FOREIGN PATENT DOCUMENTS

JP 08-158416 6/1996

(Continued)

*Primary Examiner*—John Rivell
*Assistant Examiner*—William McCalister
(74) *Attorney, Agent, or Firm*—Jules E. Goldberg; Buckley, Maschoff & Talwalkar LLC (57) ABSTRACT

A filtration device, which can be installed at a relatively low place below the full water level of a storage tank, is obtained.

The filtration device is provided with a housing 22 attached to a lower part of an upper vertical pipe 21a and an upper part of a lower vertical pipe 21b from above and below and having a rainwater flow chamber 23 and a valve chamber 24; a ball valve 29 with a specific gravity less than 1 and accommodated in the housing movably between the rainwater flow chamber and the valve chamber for blocking a lower rainwater hole 23b in the rainwater flow chamber; a storage chamber 27 for storing the rainwater having reached the valve chamber from the rainwater flow chamber; a valve-seat opening portion 24b capable of being blocked with the ball valve so as to seal the valve chamber; an upper guiding member 31 for guiding the rising ball valve from the rainwater flow chamber to the valve chamber; and a lower guiding member 32 for guiding the lowering ball valve from the valve chamber to the rainwater flow chamber. A first strainer 26 configured capable of being taken in/out through the valve-seat opening portion is detachably attached to the lower rainwater hole, and a second strainer 33 for filtrating the rainwater flowing into the storage chamber is detachably attached to the storage chamber.

19 Claims, 7 Drawing Sheets

U.S. PATENT DOCUMENTS

| | | | | |
|---|---|---|---|---|
| 807,332 | A | * | 12/1905 | Stuart ........................ 137/120 |
| 1,124,458 | A | * | 1/1915 | Kessler ...................... 137/122 |
| 1,312,738 | A | * | 8/1919 | Lear .......................... 137/122 |
| 1,950,682 | A | * | 3/1934 | Malsbary .................... 141/196 |
| 2,292,764 | A | * | 8/1942 | Levering .................... 137/122 |
| 3,489,164 | A | * | 1/1970 | Fujiwara .................... 137/192 |
| 4,428,394 | A | * | 1/1984 | Wright ....................... 137/122 |
| 5,114,594 | A | * | 5/1992 | Rosebrock et al. .......... 210/767 |
| 5,533,303 | A | * | 7/1996 | Harvey ........................ 52/16 |
| 5,681,455 | A | * | 10/1997 | Takai et al. ................ 210/154 |
| 5,863,151 | A | * | 1/1999 | Chapotelle ................... 405/52 |
| 5,873,383 | A | * | 2/1999 | Takai et al. ................ 137/357 |
| 5,985,158 | A | * | 11/1999 | Tiderington ................ 210/767 |
| 6,182,680 | B1 | * | 2/2001 | Hart .......................... 137/122 |
| 6,397,526 | B1 | * | 6/2002 | Saul et al. .................... 52/16 |
| 6,619,312 | B2 | * | 9/2003 | Doiron ....................... 137/122 |
| 6,647,670 | B1 | * | 11/2003 | Dran ........................... 52/16 |

FOREIGN PATENT DOCUMENTS

JP 09-078639 3/1997

\* cited by examiner

FLOWING-DOWN RAINWATER FILTRATION DEVICE AND RAINWATER STORAGE DEVICE USING THE SAME

TECHNICAL FIELD

The present invention relates to a flowing-down rainwater filtration device, which eliminates foreign substances mixed in rainwater dropping on a roof or a rooftop of a building and flowing down, and to a rainwater storage device using the same.

BACKGROUND ART

There has been conventionally utilized rainwater from which sand and fine dusts are eliminated and which is stored. And a rainwater filtration device for eliminating sand and dusts from the rainwater has been proposed (See Patent Document 1, for example). This filtration device comprises an outer pipe and an inner pipe provided inside this outer pipe; a vertical portion is formed in the outer pipe; and the upper end of the outer pipe is connected to a rain gutter. The lower end of the outer pipe is connected to a catch basin communicating with a sewer culvert. An outer peripheral edge of the upper end of the inner pipe is arranged with a predetermined interval from an inner peripheral surface of the vertical portion. The lower end of the inner pipe is connected to a rainwater storage tank. A part of the vertical portion of the outer pipe is formed so as to continuously change its inner diameter, and an upper part of the inner pipe is configured so as to enable adjustment of the predetermined interval by moving the inner pipe in the vertical direction. An opening portion is provided at the outer pipe in the vicinity of the upper end of the inner pipe, and a lid, which can open/close the opening portion is provided at this opening portion.

In this filtration device, rainwater flowing down through the rain gutter flows down in the layered state while adhering to the inner peripheral surface of the vertical portion of the outer pipe. At a small- to medium-scale rainfall when the rainfall intensity does not exceed the flowing-down capacity of the sewer culvert and rivers, the thickness of the layer of the rainwater flowing down on the inner peripheral surface of the vertical portion is smaller than the interval between the outer peripheral edge of the upper end of the inner pipe and the inner peripheral surface of the vertical portion, and thus the rainwater flows down only through the outer pipe into the sewer culvert via the catch basin but does not flow through the inner pipe.

At a large-scale rainfall when the rainfall intensity exceeds the flowing-down capacity of the sewer culvert and the like, the thickness of the layer of the rainwater flowing down on the inner peripheral surface of the vertical portion becomes larger than the interval, and thus the rainwater also flows down the inner pipe into the rainwater storage tank. As a result, this filtration device can divide and lead the rainwater from the rain gutter into the storage tank only at the rainfall intensity exceeding the flowing-down capacity of the sewer culvert and rivers, can be installed in a small space of an existing rain gutter with a simple structure, and can eliminate sand and fine dusts entering from the rain gutter and lead the rainwater to the storage tank.

Patent Document 1: Japanese Patent Laid-Open No. 64-83738 (Claims, FIG. 1)

DISCLOSURE OF INVENTION

Problem to be Solved by the Invention

However, when the rainwater divided using the above-mentioned conventional rainwater filtration device is stored in the storage tank, the rainwater does not reach the storage tank by its own weight unless the filtration device is provided above the full water level of the storage tank. This causes a inconvenience that the filtration device should be mounted at a relatively high place. Furthermore if the filtration device is mounted at a high place, inspection of the filtration device requires use of a stand such as steps, which causes a problem that daily inspection becomes relatively difficult.

The object of the present invention is to provide a flowing-down rainwater filtration device, which can be installed at a relatively low place below the full water level of the storage tank, and to provide a rainwater storage device using the same.

Means for Solving Problem

Figure 1:
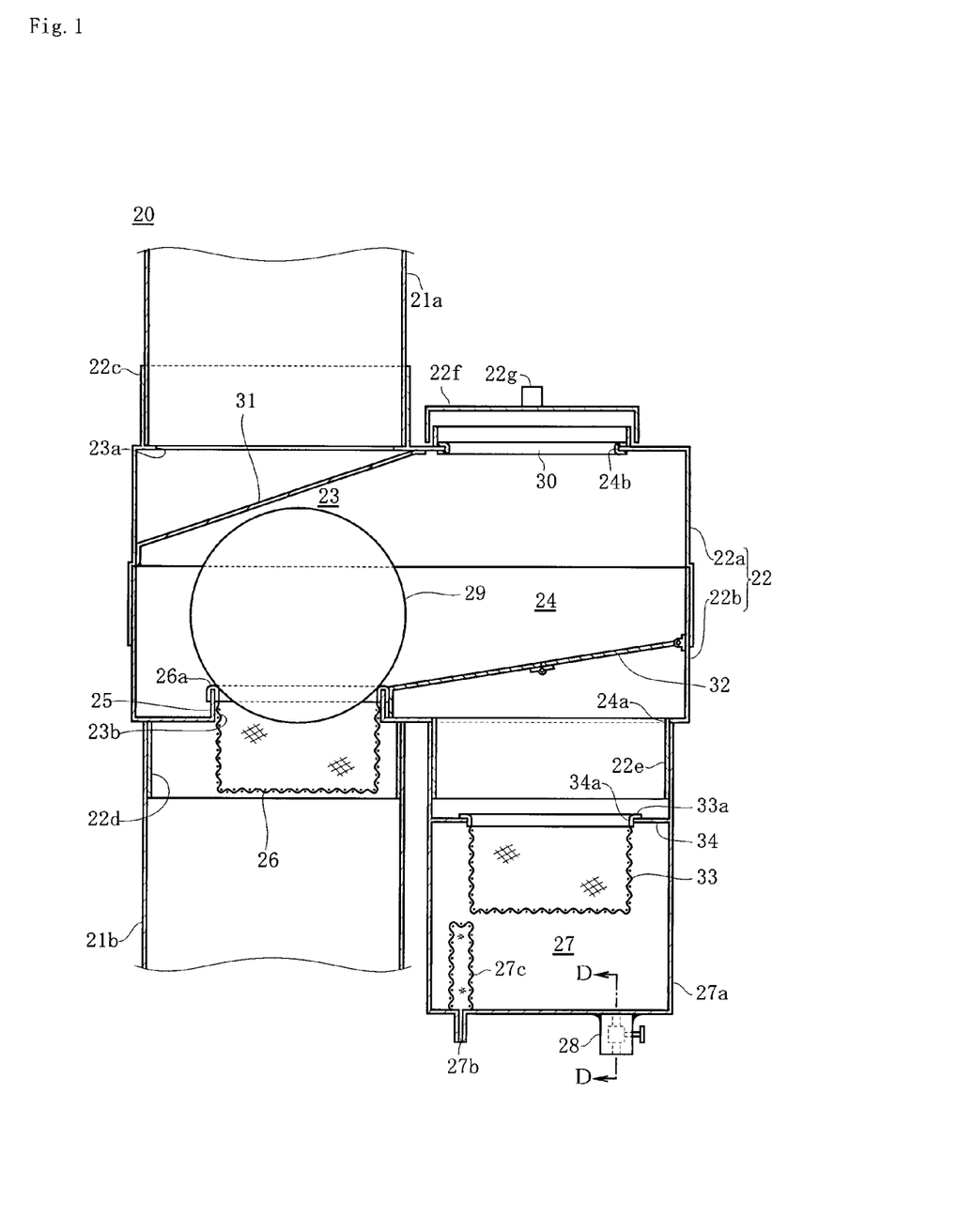
FIG. 1 is A-A sectional view of FIG. 5 illustrating a structure of a filtration device of an embodiment of the present invention.

An invention according to claim 1 is, as shown in FIG. 1, a flowing-down rainwater filtration device 20 interposed between an upper vertical pipe 21a and a lower vertical pipe 21b coaxial with the upper vertical pipe 21a for filtrating rainwater flowing down through the upper vertical pipe 21a and for guiding it to the lower vertical pipe 21b.

The characteristic configuration lie in that the flowing-down rainwater filtration device comprises a housing 22 attached to a lower part of the upper vertical pipe 21a and an upper part of the lower vertical pipe 21b from above and below and having a rainwater flow chamber 23 interposed between the upper vertical pipe 21a and the lower vertical pipe 21b and a valve chamber 24 adjacent to the rainwater flow chamber 23; an upper rainwater hole 23a formed at an upper part of the rainwater flow chamber 23 for having the rainwater flow chamber 23 communicate with the upper vertical pipe 21a so as to have the rainwater flowing down through the upper vertical pipe 21a flow into the rainwater flow chamber 23; a lower rainwater hole 23b formed at a lower part of the rainwater flow chamber 23 for having the rainwater flow chamber 23 communicate with the lower vertical pipe 21b so as to have the rainwater flowing into the rainwater flow chamber 23 flow down to the lower vertical pipe 21b; a ball valve 29 with a specific gravity less than 1 and accommodated in the housing movably between the rainwater flow chamber 23 and the valve chamber 24 for blocking the lower rainwater hole 23b when the rainwater in the rainwater flow chamber 23 is less than a predetermined amount and the ball valve is disposed in the rainwater flow chamber 23; a storage chamber 27 communicating with the valve chamber 24 and provided at a lower part of the housing 22 for storing the rainwater having reached the valve chamber 24 from the rainwater flow chamber 23; a valve-seat opening portion 24b formed at an upper part of the housing 22 opposed to the storage chamber 27 so as to open the valve chamber 24 and being capable of sealing the valve chamber 24 by being blocked with the ball valve 29 when the rainwater in the rainwater flow chamber 23 is not less than the predetermined amount and the ball valve 29 is disposed in the valve chamber 24; an upper guiding member 31 provided at the rainwater flow chamber 23 and for guiding the ball valve 29 rising in the rainwater flow chamber 23 from the rainwater flow chamber 23 to the valve chamber 24; and a lower guiding member 32 provided at the valve chamber 24 and for guiding the ball valve 29 lowering in the valve chamber 24 from the valve chamber 24 to the rainwater flow chamber 23.

In the flowing-down rainwater filtration device described in claim 1, since the rainwater in the rainwater flow chamber 23 is less than a predetermined amount at the beginning of rainfall, the ball valve 29 is guided to the rainwater flow chamber 23 from the valve chamber 24 by the lower guiding member 32 and blocks the lower rainwater hole 23b in the rainwater flow chamber 23. Therefore, though initial rainwater at the beginning of the rainfall contains a relatively large quantity of dusts, flowing-down of the initial rainwater containing the relatively large quantity of dusts into the lower vertical pipe 21b from the rainwater flow chamber 23 through the lower rain water hole 23b can be surely prevented. Then, the initial rainwater flows down into the storage chamber 27 from the rainwater flow chamber 23 through the valve chamber 24 and is stored in the storage chamber 27.

Figure 2:
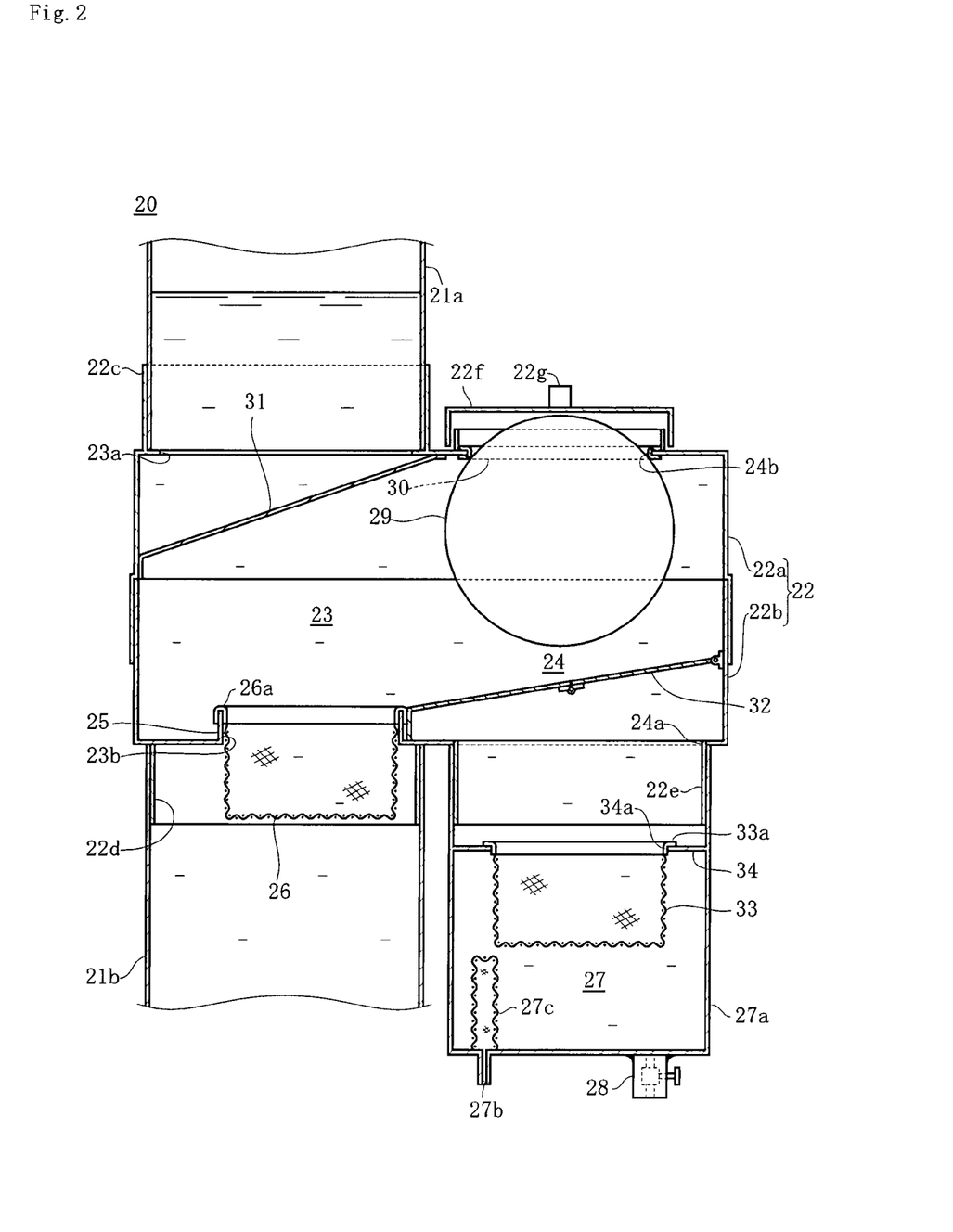
FIG. 2 is a sectional view corresponding to FIG. 1 illustrating a state where a ball valve blocks a valve-seat opening portion and seals a valve chamber.
Figure 8:
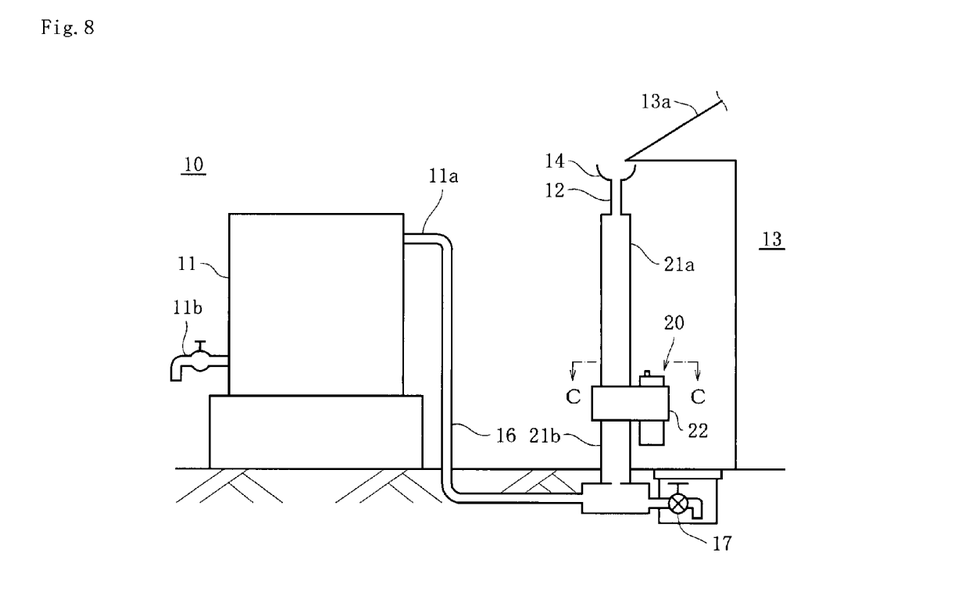
FIG. 8 is a block diagram of the rainwater storage device using the filtration device.

On the other hand, after the storage chamber 27 is filled with rainwater, the rainwater flow chamber 23 and the valve chamber 24 begin to be filled with rainwater, and when the water level is raised, the ball valve 29 with the specific gravity less than 1 is floated and the lower rainwater hole 23b is opened, and then, clean rainwater with a relatively small quantity of dusts flowing down from the upper vertical pipe 21a flows into the lower vertical pipe 21b from the rainwater flow chamber 23 through the lower rainwater hole 23b. And as shown in FIG. 2, when the water level is further raised, the ball valve 29 is guided from the rainwater flow chamber 23 to the valve chamber 24 by the upper guiding member 31 and blocks the valve-seat opening portion 24b and seals the valve-chamber 24. Therefore, as shown in FIG. 8, even if the filtration device 20 is disposed below a rainwater intake 11a of a storage tank 11, the rainwater does not leak out from the valve-seat opening portion 24b in the filtration device 20 but flows into the storage tank 11.

An invention according to claim 2 is the invention according to claim 1, wherein a first strainer 26 for filtrating rainwater of the rainwater flow chamber 23 and having it flow down into the lower vertical pipe 21b, is detachably attached to the lower rainwater hole 23b and is configured capable of being taken in/out through the valve-seat opening portion 24b; the storage chamber 27 is configured capable of accommodating the ball valve 29; the lower guiding member 32 is foldably configured so as to guide the ball valve 29 lowering in the valve chamber 24 from the valve chamber 24 to the rainwater flow chamber 23 in the extended state and to allow the ball valve 29 to move between the valve chamber 24 and the storage chamber 27 in the folded state.

Figure 4:
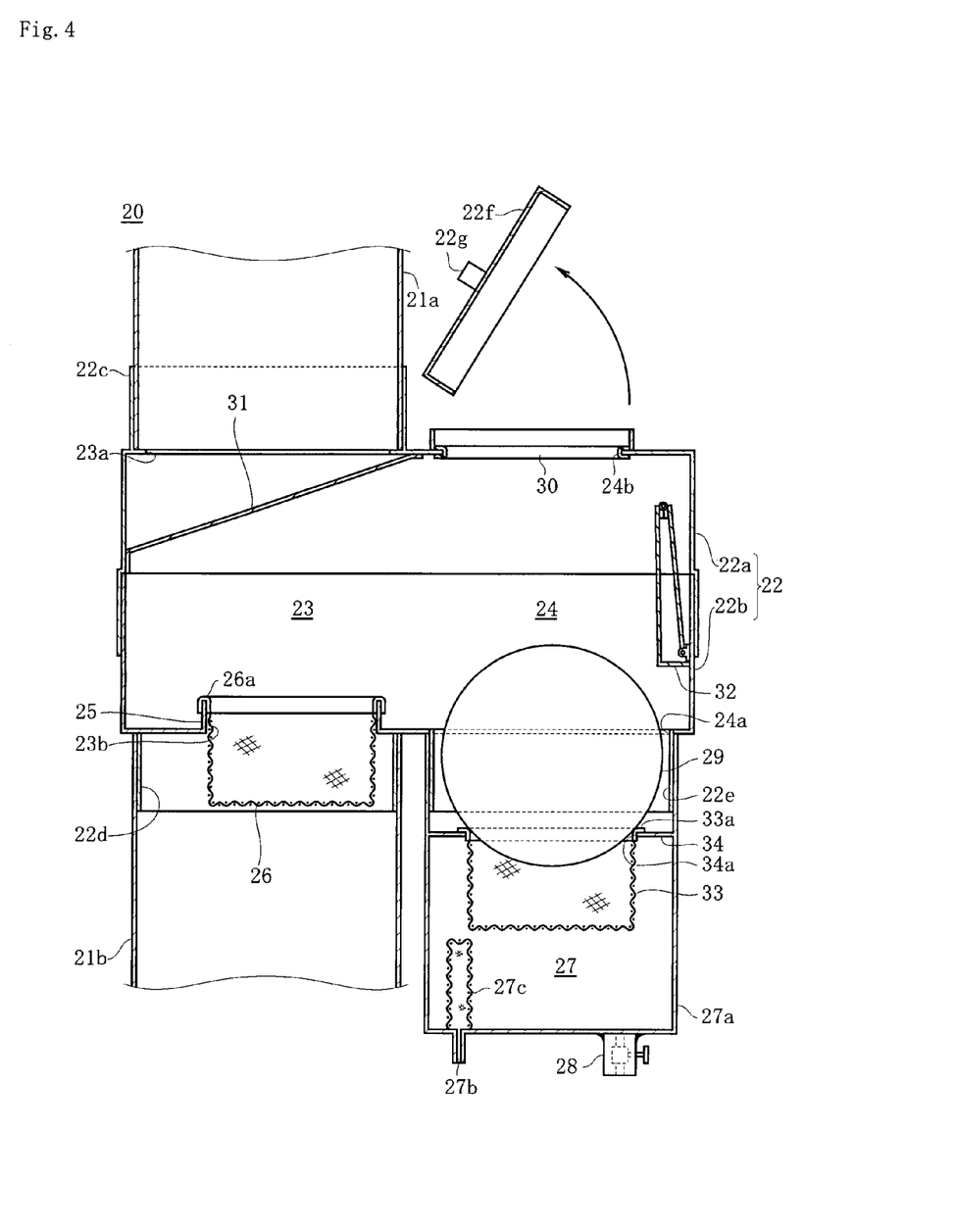
FIG. 4 is a sectional view corresponding to FIG. 1 illustrating a state where the ball valve drops into a storage chamber.

In the flowing-down rainwater filtration device described in claim 2, foreign substances mixed in rainwater flowing into the lower vertical pipe 21b through the lower rainwater hole 23b can be eliminated by the first strainer 26. On the other hand, the foreign substances are accumulated in the first strainer 26, but as shown in FIG. 4, by folding the lower guiding member 32 so as to drop the ball valve 29 into the storage chamber 27, the first strainer 26 can be taken out of the rainwater flow chamber 23 through the valve-seat opening portion 24b, and by providing the filtrating device 20 at a relative low place where inspection work is easy, the inspection of the first strainer 26 is facilitated.

An invention according to claim 3 is the invention according to claim 2, wherein a second strainer 33 for filtrating rainwater flowing into the storage chamber 27 through the valve chamber 24 from the rainwater flow chamber 23, is detachably attached to the storage chamber 27 and is configured capable of being taken in/out through the valve-seat opening portion 24b; and a small-diameter hole 27b discharging the rainwater flowing into the storage chamber 27 to the outside is provided at a lower part of the storage chamber 27.

Figure 3:
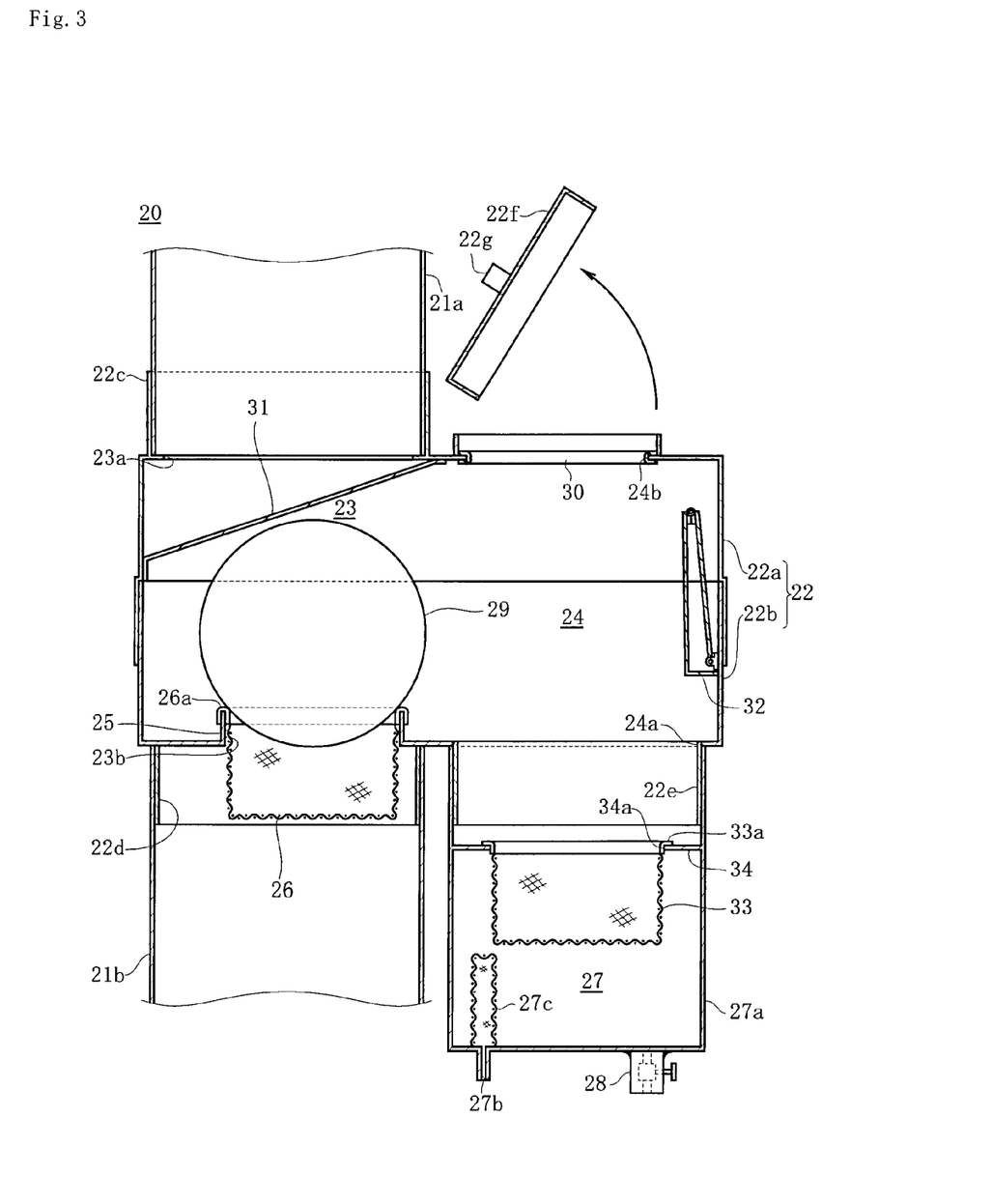
FIG. 3 is a sectional view corresponding to FIG. 1 illustrating a state where a lower guiding member is folded.

The flowing-down rainwater filtrating device described in claim 3 is capable of catching foreign substances mixed in the initial rainwater flowing into the storage chamber 27 by the second strainer 33. Therefore, a relatively large quantity of foreign substances accumulate in the second strainer 33, but as shown in FIG. 3, by folding the lower guiding member 32, the second strainer 33 can be taken out of the storage chamber 27 through the valve-seat opening portion 24b and by providing the filtration device 20 at a relatively low place where inspection work is easy, the inspection of the second strainer 33 is facilitated. Also, though the storage chamber 27 is easily stained by dusts existing in a relatively large quantity in the initial rainwater, the stain can be decreased by providing the second strainer 33. Moreover, since the small-diameter hole 27b is provided at the lower part of the storage chamber 27, the initial rainwater flowing and stored in the storage chamber 27 is gradually discharged from the small-diameter hole 27b to the outside, by which a situation that the rainwater is stored in the storage chamber 27 even after the rain stops can be effectively avoided.

An invention according to claim 4 is the invention according to claim 2 or 3, wherein a ring-shaped projection 25 is formed so as to project upward on the inner peripheral edge of the lower rainwater hole 23b, and the peripheral edge of the first strainer 26 is disposed at the upper edge of the projection 25 so that the first strainer 26 is detachably attached to the lower rainwater hole 23b.

In the flowing-down rainwater filtration device described in claim 4, the initial rainwater containing a relatively large quantity of dusts at the beginning of rainfall can be stored in the storage chamber 27 through the valve chamber 22 from the periphery of the projection 25. And the first strainer 26 can be taken out of the rainwater flow chamber 23 with a relatively simple work of only lifting the first strainer 26 upward so that the inspection work can be relatively facilitated.

An invention according to claim 5 is a rainwater storage device which is provided with the filtration device 20 described in any one of claims 1 to 4, as shown in FIG. 8; the rainwater storage tank 11 having a rainwater intake 11a disposed above the filtration device 20; and a rainwater guide pipe 16 with one end connected to the lower end of the lower vertical pipe 21b and the other end connected to the rainwater intake 11a wherein the upper end of the upper vertical pipe 21a is disposed above the rainwater intake 11a.

In the rainwater storage device described in claim 5, when the rainwater filtered by the filtration device 20 and stored in each inside of the lower vertical pipe 21b and the rainwater guide pipe 16 raises the water level and reaches the rainwater intake 11a, the rainwater flows into the storage tank 11 from the intake 11a and is stored. As a result, the stored rainwater can be taken out for usage as necessary.

An invention according to claim 6 is the invention according to claim 5 and a rainwater storage device in which a drain valve 17 capable of discharging the rainwater in each inside of the upper vertical pipe 21a, the lower vertical pipe 21b and the rainwater guide pipe 16 to the outside is provided at the lower vertical pipe 21b or the rainwater guide pipe 16.

In the rainwater storage device described in claim 6, the majority of the dusts are eliminated by the filtration device 20 but after a use of the filtration device 20 for a longtime, it is fared that the foreign substances having passed through the filtration device 20, though in a small amount, settle and precipitate in each inside of the lower vertical pipe 21b and the rainwater guide pipe 16. Therefore, the insides of the lower vertical pipe 21b and the rainwater pipe 16 needs to be washed in every predetermined period. In the rainwater storage device according to claim 6, water can be made to flow through each inside of the lower vertical pipe 21b and the rainwater guide pipe 16 by opening the drain valve 17, which allows the foreign substances settled in the insides of the lower vertical pipe 21b and the rainwater guide pipe 16 to be easily discharged to the outside.

Figure 9:
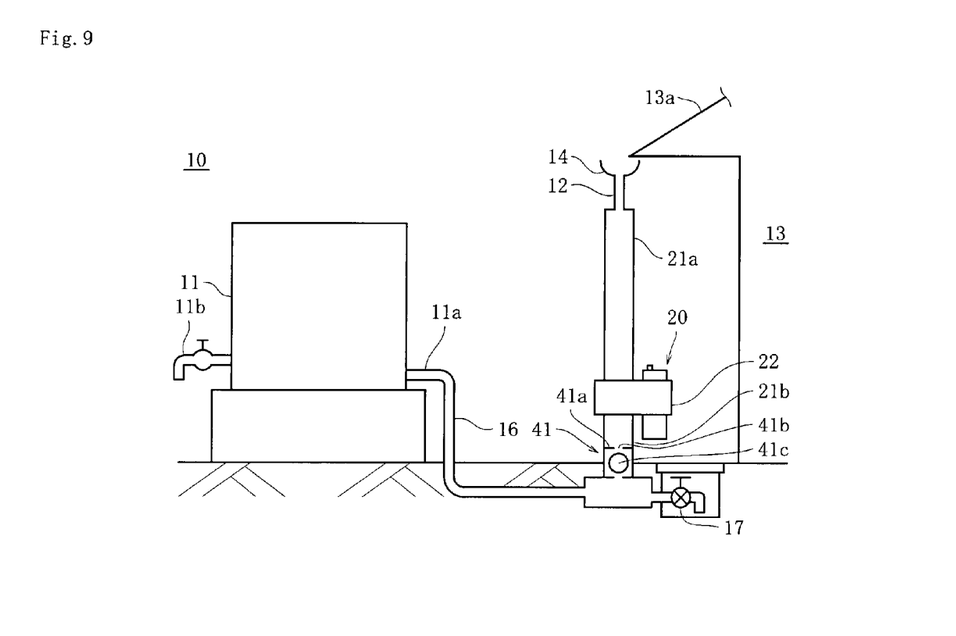
FIG. 9 is a block diagram of another rainwater storage device using the filtration device.

An invention according to claim 7 is the invention according to claim 5 or 6, and, as shown in FIG. 9, is a rainwater storage device provided with a check valve 41 for preventing a rainwater flow from the rainwater guide pipe 16 to the lower vertical pipe 21b is provided at the lower end of the lower vertical pipe 21b or the rainwater guide pipe 16.

In this rainwater storage device according to claim 7, even if the water level on the one end side of the rainwater guide pipe 16 communicating with the upper vertical pipe 21a through the lower vertical pipe 21b and the filtration device 20 is lower than the water level on the other end side of the rainwater guide pipe 16 communicating with the rainwater storage tank 11, the rainwater does not backflow from the rainwater guide pipe 16 to the lower vertical pipe 21b. Therefore the rainwater intake 11a can be attached to a lower part of the rainwater storage tank 11, for example, close to the bottom, so that the length of the rainwater guide pipe 16 exposed above the ground surface with the other end connected to the rainwater intake 11a can be reduced and the appearance of the entire device can be improved.

EFFECT OF THE INVENTION

The flowing-down rainwater filtration device of the present invention comprises the housing having the rainwater flow chamber and the valve chamber; the ball valve with a specific gravity less than 1 accommodated in the housing movably between the rainwater flow chamber and the valve chamber and blocking the lower rainwater hole when it is disposed in the rainwater flow chamber; the storage chamber for storing the rainwater having reached the valve chamber from the rainwater flow chamber; the valve-seat opening portion capable of being blocked with the ball valve when the ball valve is disposed in the valve chamber; the upper guiding member for guiding the rising ball valve from the rainwater flow chamber to the valve chamber; and the lower guiding member for guiding the lowering ball valve from the valve chamber to the rainwater flow chamber. This configuration allows the initial rainwater containing a relatively large quantity of dusts can be surely prevented from flowing down from the rainwater flow chamber to the lower vertical pipe by blocking the lower rainwater hole with the ball valve. After the storage chamber is filled with the initial rainwater, the ball valve is floated, and then, clean rainwater with a relatively small quantity of dusts flowing down from the upper vertical pipe can be made to flow into the lower vertical pipe through the lower rainwater hole.

On the other hand, when the water level is raised, the ball valve blocks the valve-seat opening port and seals the valve chamber. Therefore, even if the filtration device is disposed below the rainwater intake of the storage tank, the rainwater does not leak out of the valve-seat opening port of the filtration device but the rainwater can be made to flow into the storage tank. And by detachably attaching the first strainer to the lower rainwater hole, the foreign substances mixed in the rainwater flowing into the lower vertical pipe through the lower rainwater hole can be eliminated by the first strainer, and by detachably attaching the second strainer to the storage chamber, the foreign substances mixed in the initial rainwater can be caught by the second strainer. Moreover, by detachably attaching the first and the second strainers through the valve-seat opening port, the inspection work is facilitated.

Also, in the rainwater storage device comprising the filtration device; the rainwater storage tank having the rainwater intake disposed above the filtration device; and the rainwater guide pipe with one end connected to the lower end of the lower vertical pipe and the other end connected to the rainwater intake, in which the upper end of the upper vertical pipe is disposed above the rainwater intake; the rainwater filtered by the filtration device and stored in each inside of the lower vertical pipe and the rainwater guide pipe flows into the storage tank and stored therein when the water level is raised and reaches the rainwater intake. As a result, the stored rainwater can be taking out for usage as necessary.

EXPLANATION OF REFERENCE NUMERALS

10 Rainwater storage device
11 Rainwater storage tank
11a Rainwater intake
16 Rainwater guide pipe
17 Drain valve
20 Filtration device
21a Upper vertical pipe
21b Lower vertical pipe
22 Housing
23 Rainwater flow chamber
23a Upper rainwater hole
23b Lower rainwater hole
24 Valve chamber
24b Valve-seat opening portion
25 Projection
26 First strainer
27 Storage chamber
27b Small-diameter hole
29 Ball valve
31 Upper guiding member 32 Lower guiding member
33 Second strainer
41 Check valve

BEST MODE FOR CARRYING OUT THE INVENTION

A best mode for carrying out the present invention will be described below referring to the attached drawings.

As shown in FIG. 8, a rainwater storage device 10 of the present invention comprises a rainwater storage tank 11 for storing rainwater; a rainwater inflow pipe 12 for supplying the rainwater to the rainwater storage tank 11; an upper vertical pipe 21a having its upper end connected to the lower end of the rainwater inflow pipe 12; a lower vertical pipe 21b coaxial with the upper vertical pipe 21a; and a flowing-down rainwater filtration device 20 interposed between the upper vertical pipe 21a and the lower vertical pipe 21b. The rainwater inflow pipe 12 shown in the figure is a cylindrical body with the upper end connected to a rain gutter 14 provided at the edge of a roof 13a of a house 13 and it is configured such that rain dropping on the roof 13a of the house 13 flows into the rain gutter 14 and is collected, and the collected rainwater enters the rainwater inflow pipe 12 from the rain gutter 14 and flows down to the upper vertical pipe 21a. The filtration device 20 filtrates and guides the rainwater flowing down the upper vertical pipe 21a to the lower vertical pipe 21b, and the lower end of the lower vertical pipe 21b and the storage tank 11 are connected via a rainwater guide pipe 16.

As shown in FIGS. 1 to 5, the filtration device 20 is provided with a housing 22 to which the lower part of the upper vertical pipe 21a and the upper part of the lower vertical pipe 21b attached from above and below. The housing 22 is formed in an oval shape with the major axis approximately twice as large as the outer diameters of the vertical pipes 21a, 21b when seen from above and the minor axis slightly larger than the outer diameter of the vertical pipes 21a, 21b (FIG. 5) and is assembled by fitting a lower lid 22b made of a resin molding into the periphery of an upper lid 22a. At an upper part of one end of the housing 22, an upper short pipe 22c to which the lower part of the upper vertical pipe 21a is inserted is provided, and at a lower part of the one end of the housing 22 opposed to the upper short pipe 22c, a lower short pipe 22d into which the upper part of the lower vertical pipe 21b is fitted is provided. By inserting the lower part of the upper vertical pipe 21a into the upper short pipe 22c and fitting the upper part of the lower vertical pipe 21b into the lower short pipe 22d, the upper and lower vertical pipes 21a and 21b are attached to the housing 22 from above and below, respectively. And in the inside of the housing 22, a rainwater flow chamber 23 interposed between the upper vertical pipe 21a and the lower vertical pipe 21b and a valve chamber 24 adjacent to the rainwater flow chamber 23 are formed.

As shown in FIGS. 1 to 4, at the upper part of the rainwater flow chamber 23, an upper rainwater hole 23a which has the rainwater flow chamber 23 communicate with the upper vertical pipe 21a is formed to have rainwater flowing down the upper vertical pipe 21a flow into the rainwater flow chamber 23. On the other hand, at the lower part of the rainwater flow chamber 23, a lower rainwater hole 23b which has the rainwater flow chamber 23 communicate with the lower vertical pipe 21b is formed to have the rainwater flowing into the rainwater flow chamber 23 flow down to the lower vertical pipe 21b. On the inner peripheral edge of the lower rainwater hole 23b, a ring-shaped projection 25 is formed so as to project upward, and at the upper edge of the projection 25, the peripheral edge of the first strainer 26 is installed so that the first strainer 26 is detachably attached to the lower rainwater hole 23b. The first strainer 26 in this embodiment is molded from a metal mesh into the bottomed cylindrical shape and the outer diameter of the bottomed cylindrical strainer 26 is formed slightly smaller than the inner diameter of the ring-shaped projection 25, and a flange 26a which can be installed at the upper end of the projection 25 is formed at the peripheral edge of the opening portion of the strainer 26. By installing the flange 26a at the projection 25 and inserting the bottomed cylindrical portion into the lower rainwater hole 23b, the strainer 26 is detachably attached to the lower rainwater hole 23b.

On the other hand, another short pipe 22e is provided adjacently to the lower short pipe 22d at the lower part of the other end of the housing 22. A bottomed cylindrical storage case 27a with its inside forming the storage chamber 27 is fitted on the another short pipe 22e from below so that the storage case 27a is provided at the lower part of the housing 22. At the lower part of the valve chamber 24, an inflow hole 24a is formed which has the valve chamber 24 communicate with the storage chamber 27 so that the rainwater having reached the valve chamber 24 from the rainwater flow chamber 23 further flows down to the storage chamber 27 and is stored in the storage chamber 27. At the bottom portion of the storage chamber 27, a drain valve 28 for draining the rainwater flowing into the storage chamber 27 and a small-diameter hole 27b for draining the rainwater, though slightly, are provided.

The small-diameter hole 27b has a circular section and a diameter of 0.8 to 1.5 mm. This small-diameter hole 27b is provided in order to gradually drain the initial rainwater having flown into and having been stored in the storage chamber 27 to the outside and to empty the storage chamber 27 after the rainfall stops, allowing to avoid a situation that the rainwater remains stored in the storage chamber 27 even after the rainfall stops. Therefore, this filtration device 20 is configured such that the presence of this small-diameter hole 27b allows the initial rainwater to be surely stored in the storage chamber 27 when a rainfall starts again after it stopped once. However, this small-diameter hole 27b is relatively easy to be clogged, and for preventing the clogging, a vertically long mesh 27c covering the small-diameter hole 27b from above is provided at the storage chamber 27. This mesh 27c is configured to be formed vertically long so that a filtration area can be expanded and the clogging of the mesh 27c can be prevented.

Figure 6:
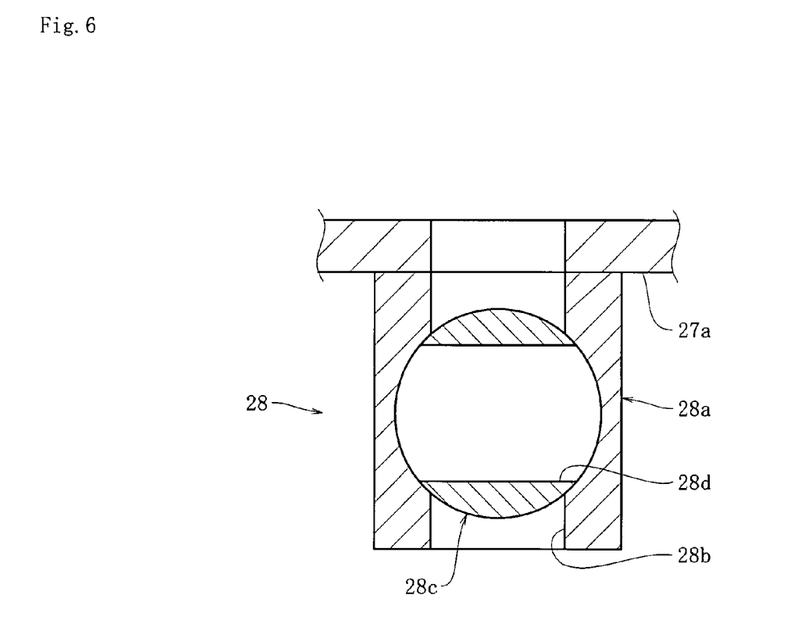
FIG. 6 is an enlarged sectional view of D part in FIG. 1 illustrating a drain valve with its large-diameter hole crossing the shaft center of a center hole.
Figure 7:
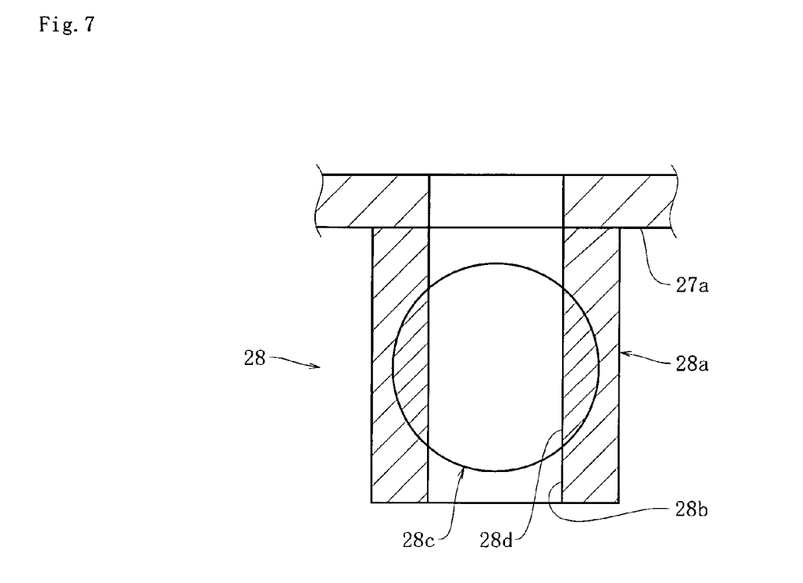
FIG. 7 is a sectional view corresponding to FIG. 6 illustrating a drain valve having its large-diameter hole according to the shaft center of the center hole.

As shown in FIGS. 6 and 7, the drain valve 28 is provided with a cylindrical body 28a and a rotary valve 28c which shuts a lower rainwater hole 28b of the cylindrical body 28a and is provided rotatably. The lower rainwater hole 28b has a circular section and a diameter of 8 to 15 mm. At the rotary valve 28c, a large-diameter hole 28d with the same hole diameter as that of the lower rainwater hole 28b is formed. This drain valve 28 is configured such that by rotating the rotary valve 28c so as to cross the shaft center of the large-diameter hole 28d with the shaft center of the lower rainwater hole 28b as shown in FIG. 6, the rainwater flowing into the storage chamber 28 is stored in the storage chamber 27 and by rotating the rotary valve 28c so as to make the shaft center of the large-diameter hole 28d accord to the shaft center of the lower rainwater hole 28d, the rainwater stored in the storage chamber 27 is drained to the outside relatively rapidly through the large-diameter hole 28d.

Returning to FIGS. 1 to 4, the ball valve 29 movable between the rainwater flow chamber 23 and the valve chamber 24 is accommodated in the housing 22. The ball valve 29 is a ball with the specific gravity less than 1. The valve-seat opening portion 24b capable of sealing the valve chamber 24 by being blocked with the ball valve 29 is formed so as to open the valve chamber 24 to the upper part of the housing 22 opposed to the storage chamber 27. A packing 30 is fitted on the edge of the valve-seat opening portion 24b, and the ball valve 29 is configured to be floated in the valve chamber 24 and brought into contact with the packing 30 when the rainwater in the rainwater flow chamber 23 is not less than a predetermined amount, by which the ball valve 29 blocks the valve-seat opening portion 24b and seals the valve chamber 24. And the valve-seat opening portion 24b is sized to enable the first strainer 26 to be inserted; a lid body 22f is detachably provided on the top face of the housing 22 so as to cover the valve-seat opening portion 24b; and a knob portion 22g is formed on the lid body to be grasped by a worker.

Figure 5:
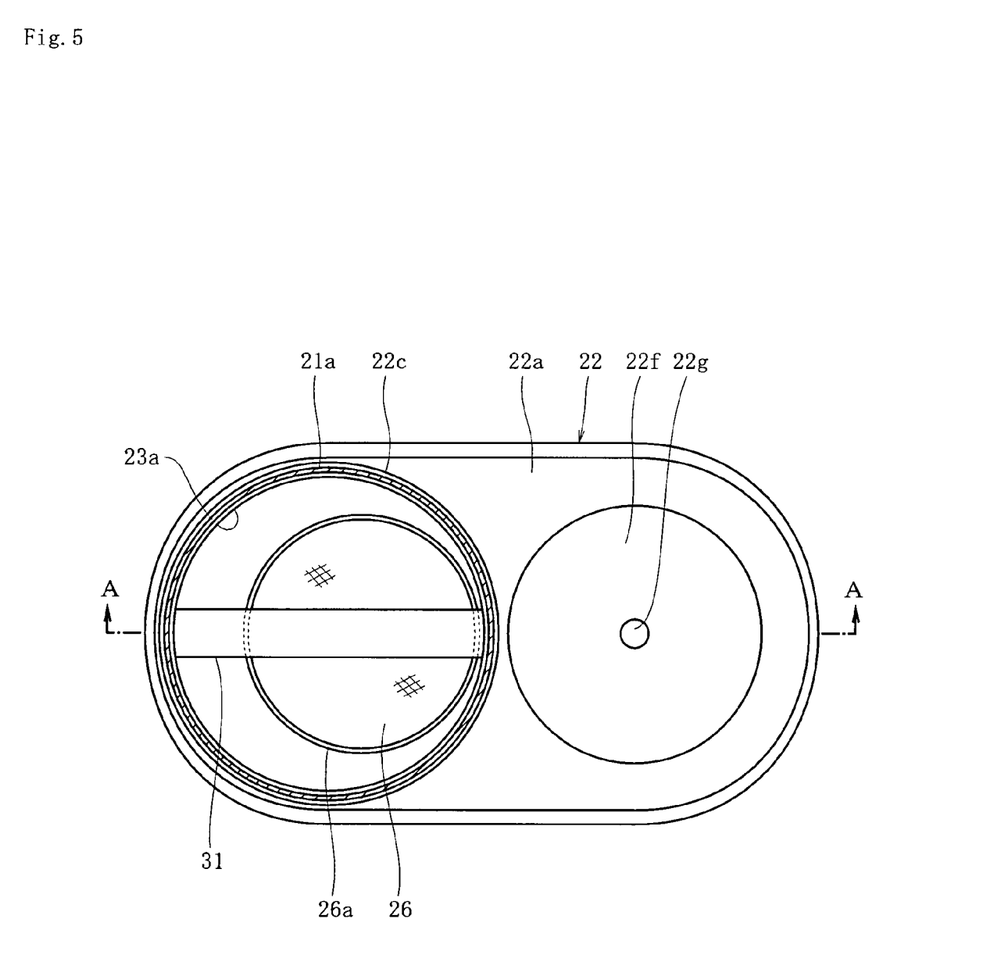
FIG. 5 is C-C sectional view of the filtration device used in a rainwater storage device shown in FIG. 8.

Also, in the rainwater flow chamber 23, an upper guiding member 31 is provided for guiding the ball valve 29 rising in the rainwater flow chamber 23 from the rainwater flow chamber 23 to the valve chamber 24, and in the valve chamber 24, a lower guiding member 32 is provided for guiding the ball valve 29 lowering in the valve chamber 24 from the valve chamber 24 to the rainwater flow chamber 23. The upper guiding member 31 is a plate material provided at the upper part of the rainwater flow chamber 23, crossing the rainwater flow chamber 23 while being inclined upward to the valve chamber 24 (FIG. 5). On the other hand, the lower guiding member 32 is a plate material provided at the lower part of the valve chamber 24, crossing the valve chamber 24 while being inclined downward to the rainwater flow chamber 23 and configured capable of being folded. This lower guiding plate 32 is configured so as to guide in the extended state the ball valve 29 lowering in the valve chamber 24 from the valve chamber 24 to the rainwater flow chamber 23 and to allow the ball valve 29 to move between the valve chamber 24 and the storage chamber 27 in the folded state.

The storage chamber 27 is configured capable to accommodate the ball valve 29, and a bottomed cylindrical second strainer 33 for filtrating the rainwater flowing from the valve chamber 24 to the storage chamber 27 is detachably attached to the storage chamber 27. This second strainer 33 is formed so as to pass through the valve-seat opening portion 24b. In this embodiment, a horizontal flat board 34 vertically partitioning the storage chamber 27 is provided, and a center hole 34a is formed on this flat board 34, to which the second strainer 33 is detachably attached. This second strainer 33 is molded from a metal mesh into the bottomed cylindrical state, and its outer diameter is formed slightly smaller than the inner diameter of the center hole 34a, and a flange 33a which can be attached to the hole edge of the center hole 34a is formed at the peripheral edge of the opening portion of the second strainer 33. The second strainer 33 is detachably attached to the storage chamber 27 by inserting the bottomed cylindrical portion into the center hole 34a and installing the flange 33a at the hole edge of the center hole 34a.

As shown in FIG. 8, a rainwater intake 11a is formed on the upper sidewall of the rainwater storage tank 11, and the rainwater intake 11a is formed above the filtration device 20. The upper end of the upper vertical pipe 21a is configured to be disposed above the rainwater intake 11a. One end of the rainwater guide pipe 16 is connected to the lower end of the lower vertical pipe 21b while the other end of the rainwater guide pipe 16 is connected to the rainwater intake 11a. This configuration may cause a case where the rainwater is collected in each inside of the upper vertical pipe 21a, the lower vertical pipe 21b and the rainwater guide pipe 16. Therefore a drain valve 17 which can drain the rainwater in each inside of the upper vertical pipe 21a, the lower vertical pipe 21b and the rainwater guide pipe 16 to the outside is provided at the lower end of the vertical pipe 21.

Next, operation of the rainwater storage device configured as above will be described.

When rain drops on a roof 13a of a house 13, the rain flows along the inclination of the roof 13a into the rain gutter 14 and is collected there. The collected rainwater enters the rainwater inflow pipe 12, flows down inside the rainwater inflow pipe 12 and reaches the filtration device 20 through the upper vertical pipe 21a. In the filtration device 20 at the beginning of rainfall, the rainwater in the rainwater flow chamber 23 is less than a predetermined amount, and thus, as shown in FIG. 1, the ball valve 29 is guided by the lower guiding member 32 from the valve chamber 24 to the rainwater flow chamber 23 and blocks the lower rainwater hole 23b in the rainwater flow chamber 23. Therefore, the majority of the initial rainwater which flows from the upper vertical pipe 21a to the rainwater flow chamber 23 at the beginning of the rainfall is received by the peripheral face of the ring-shaped projection 25, guided to the valve chamber 24 and further flows down into the storage chamber 27. Thus, though the initial rainwater at the beginning of the rainfall contains a relatively large quantity of dusts, it can be surely prevented that the initial rainwater containing a relatively large quantity of dusts flows from the rainwater flow chamber 23 through the lower rainwater hole 23b to the lower vertical pipe 21b. Here, the relatively large quantity of dusts contained in the initial rainwater is caught by the second strainer 33 provided at the storage chamber 27, the filtrated rainwater reaches the bottom portion of the storage chamber 27 and is stored in this storage chamber 27.

When the rainfall continues and the rainwater amount flowing down through the rainwater flow pipe 12 increases, exceeding the amount drained to the outside through the small-diameter hole 27b formed at the storage chamber 27, the rainwater overflows out of the storage chamber 27 and begins to be collected in the rainwater flow chamber 23 and the valve chamber 24. And when the level of the collected water exceeds the upper end of the ring-shaped projection 25, the ball valve 29 with the specific gravity less than 1 floats, and then allowing clean rainwater with a relatively small quantity of dusts flowing down from the upper vertical pipe 21a to flow from the rainwater flow chamber 23 through the lower rainwater hole 23b to the lower vertical pipe 21b. Here, since the first strainer 26 is attached to the lower rainwater hole 23b so as to block the lower rainwater hole 23b, mixed foreign substances is eliminated by the strainer 26 from the rainwater flowing down through the lower rainwater hole 23b to the lower vertical pipe 21b.

On the other hand, when the rainwater amount flowing down through the rainwater inflow pipe 12 is increased, the rainwater is collected inside the valve chamber 24 and the water level is raised, causing the ball valve 29 to float in the rainwater flow chamber 23. As shown in FIG. 2, the ball valve 29 floating in the rainwater flow chamber 23 is guided by the upper guiding member 31 from the rainwater flow chamber 23 to the valve chamber 24 and is brought into contact with the valve-seat opening portion 24b from below in the valve chamber 24 and seals the valve chamber 24. Therefore, as shown in FIG. 8, even if the filtration device 20 is disposed below the rainwater intake 11a of the storage tank 11, a situation that the rainwater does not flow into the storage tank 11 but is drained outside from the valve-seat opening portion 24b can be avoided. And at a time when the water level of the rainwater collected in each inside of the upper vertical pipe 21a, the lower vertical pipe 21b and the rainwater guide pipe 16 is raised and reaches the rainwater intake 11a, the rainwater flows into the storage tank 11 from the intake 11a and is stored therein. The rainwater stored in the storage tank 11 can be taken out of a faucet 11b as necessary and used for watering or car wash. Here, since the upper end of the upper vertical pipe 21a is disposed above the rainwater intake 11a, a situation that the rainwater does not flow into the storage tank 11 but is discharged from the upper end of the upper vertical pipe 21a to the outside can be avoided.

Here, eliminated foreign substances accumulate on the first and the second strainers 26, 33 of the filtration device 20. Thus, it is necessary to take out these strainers 26, 33 and wash them per predetermined period. For taking out these strainers 26, 33, the lid body 22f is removed to expose the valve-seat opening portion 24b when it is not raining. Then, since the ball valve 29 has been guided by the lower guiding member 32 into the rainwater flow chamber 23 and has blocked the lower rainwater hole 23b, the valve-seat opening port 24b is open. Thus, as show in FIG. 3, by reaching the lower guiding member 32 through the valve-seat opening portion 24b and folding it, the second strainer 33 can be taken out of the storage chamber 27 through the valve-seat opening portion 24b. Also, by folding the lower guiding member 32 and dropping the ball valve 29 which blocks the lower channel hole 23b into the storage chamber 27, the first strainer 26 can be taken out of the rainwater flow chamber 23 through the valve-seat opening portion 24b. Thus, the first and the second strainers 26, 33 can be easily taken out of the housing 22, enabling the inspection and cleaning to be carried out relatively easily.

On the other hand, in a case immediately after the rainfall stops, where the ball valve 29 blocks the valve-seat opening portion 24b when the lid body 22f is removed, the rotary valve 28c of the drain valve 28 is rotated so that the shaft center of the large-diameter hole 28d accords to the shaft center of the lower rainwater hole 28b as shown in FIG. 7. Then the rainwater inside the storage chamber 27 is rapidly drained to the outside so as to open the valve-seat opening portion 24b. The first and the second strainers 26, 33 can be taken out through this opening portion 24b when the drain valve 28 is opened, the rainwater in the storage chamber 27 can be discharged to the outside together with the dusts in the storage chamber 27. Moreover, in a case some time after the rainfall stops, where the rainwater in the storage chamber 27 is drained form the small-diameter hole 27b to the outside and the storage chamber 27 has been emptied, by pouring water into the storage chamber 27 using a bucket or a watering pot from the valve-seat opening portion 24b and opening the drain valve 28, the dusts can be discharged with the poured rainwater to the outside.

In the above embodiment, the rainwater storage device comprising the rainwater storage tank 11 in which the rainwater intake 11a is formed on the upper sidewall was described, but as shown in FIG. 9, the rainwater intake 11a may be formed on the lower sidewall of the rainwater storage tank 11. However, in this case, when the water level of the rainwater in the rainwater storage tank 11 is higher than the filtration device 20, the rainwater backflows from the rainwater intake 11a to the rainwater guide pipe 16 and flows out to the outside through the small-diameter hole 27b of the filtration device 20. Thus, it is necessary to provide a check valve 41 configured to prevent a rainwater flow from the rainwater guide pipe 16 toward the lower vertical pipe 21b at the lower end of the lower vertical pipe 21b or at the rainwater guide pipe 16. The check valve 41 shown in FIG. 9 is provided with a valve seat 41a in which a round hole 41b is formed at the center and with a ball valve 41c which is provided below the valve seat 41a and is capable of sealing the round hole 41b, and when the ball valve 41c seals the round hole 41b, it is prevented that the rainwater flows from the rainwater guide pipe 16 toward the lower vertical pipe 21b. By providing the check valve 41 as above, the rainwater intake 11a can be attached at a low position of the rainwater storage tank 11, for example, close to the bottom. When the rainwater intake 11a is disposed at the low position of the rainwater storage tank 11, the length of the rainwater guide pipe 16 having the other end connected to the rainwater intake 11a and exposed above the ground can be reduced and a visual impression of being relatively long thereof is prevented from being given, which can improve appearance of the entire device.

Also, in the above embodiment, a case that the lower end of the rainwater inflow pipe 12 connected to the rain gutter 14 is connected to the upper end of the upper vertical pipe 21a was described, but the upper end of the upper vertical pipe 21a may be directly connected to the rain gutter 14.

Moreover, in the above embodiment, the first and the second strainers 26, 33 molded from a metal mesh into the bottomed cylinder state were described, but the first and the second strainers 26, 33 may be formed from a mesh made of a resin into a bag state, for example, as long as it can filtrate rainwater. Particularly if the first and the second strainers 26, 33 are formed by a resin with flexibility, the first and the second strainers 26, 33 can be taken out of the valve-seat opening portion 24b in the deformed state, which improves degrees of freedom in the design.

INDUSTRIAL APPLICABILITY

A flowing-down rainwater filtration device can be installed at a relatively low place below the full water level of a storage tank.

What is claimed is:
1. A flowing-down rainwater filtration device (20) interposed between an upper vertical pipe (21a) and a lower vertical pipe (21b) coaxial with the upper vertical pipe (21a) for filtrating rainwater flowing down through the upper vertical pipe (21a) and guiding the rainwater to the lower vertical pipe (21b), comprising:
  a housing (22) attached to a lower part of the upper vertical pipe (21a) and an upper part of the lower vertical pipe (21b) from above and below and having a rainwater flow chamber (23) interposed between the upper vertical pipe (21a) and the lower vertical pipe (21b) and a valve chamber (24) adjacent to the rainwater flow chamber (23);
  an upper rainwater hole (23a) formed at an upper part of the rainwater flow chamber (23) for having the rainwater flow chamber (23) communicate with the upper vertical pipe (21a) so as to have the rainwater flowing down through the upper vertical pipe (21a) flow into the rainwater flow chamber (23) ;
  a lower rainwater hole (23b) formed at a lower part of the rainwater flow chamber (23) for having the rainwater flow chamber (23) communicate with the lower vertical pipe (21b) so as to have the rainwater flowing into the rainwater flow chamber (23) flow down to the lower vertical pipe (21b);
  a ball valve (29) with a specific gravity less than 1 and accommodated in the housing (22) movably between the rainwater flow chamber (23) and the valve chamber (24) for blocking the lower rainwater hole (23b) when the rainwater in the rainwater flow chamber (23) is less than a predetermined amount and the ball valve is disposed in the rainwater flow chamber (23);

a storage chamber (27) communicating with the valve chamber (24) and provided at a lower part of the housing (22), for storing the rainwater having reached the valve chamber (24) from the rainwater flow chamber (23);

a valve-seat opening portion (24b) formed at an upper part of the housing (22) opposed to the storage chamber (27) so as to open the valve chamber (24) and being capable of sealing the valve chamber (24) by being blocked with the ball valve (29) when the rainwater in the rainwater flow chamber (23) is not less than the predetermined amount and the ball valve (29) is disposed in the valve chamber (24);

an upper guiding member (31) provided at the rainwater flow chamber (23) and for guiding the ball valve (29) rising in the rainwater flow chamber (23) from the rainwater flow chamber (23) to the valve chamber (24); and a lower guiding member (32) provided at the valve chamber (24) and for guiding the ball valve (29) lowering in the valve chamber (24) from the valve chamber (24) to the rainwater flow chamber (23).

2. The flowing-down rainwater filtration device according to claim 1, wherein a first strainer (26) for filtrating rainwater of the rainwater flow chamber (23) and having it flow down into the lower vertical pipe (21b), is detachably attached to the lower rainwater hole (23b)and is configured so as to be removable through the valve-seat opening portion (24b); the storage chamber (27) is configured capable of accommodating the ball valve (29); the lower guiding member (32) is foldably configured so as to guide the ball valve (29) lowering in the valve chamber (24) from the valve chamber (24) to the rainwater flow chamber (23) in the extended state and to allow the ball valve (29) to move between the valve chamber (24) and the storage chamber (27) in the folded state.

3. The flowing-down rainwater filtration device according to claim 2, wherein a second strainer (33) for filtrating rainwater flowing into the storage chamber (27) through the valve chamber (24) from the rainwater flow chamber (23), is detachably attached to the storage chamber (27) and is configured capable of being taken in/out through the valve-seat opening portion (24b); and a small-diameter hole (27b) for discharging the rainwater flowing into the storage chamber (27) to the outside is provided at a lower part of the storage chamber (27).

4. The flowing-down rainwater filtration device according to claim 2 or 3, wherein a ring-shaped projection (25) is formed so as to project upward on the inner peripheral edge of the lower rainwater hole (23b), and the peripheral edge of the first strainer (26) is disposed at the upper edge of the projection (25) so that the first strainer (26) is detachably attached to the lower rainwater hole (23b).

5. A rainwater storage device comprising:
the filtration device (20) according to claim 4;
a rainwater storage tank (11) having the rainwater intake (11a) disposed above the filtration device (20); and
a rainwater guide pipe (16) with one end connected to the lower end of the lower vertical pipe (21b) and the other end connected to the rainwater intake (11a), wherein the upper end of the upper vertical pipe (21a) is disposed above the rainwater intake (11a).

6. The rainwater storage device according to claim 5, wherein a check valve (41) for preventing a rainwater flow from the rainwater guide pipe (16) to the lower vertical pipe (21b) is provided at the lower end of the lower vertical pipe (21b) or the rainwater guide pipe (16).

7. The rainwater storage device according to claim 5, wherein a drain valve (17) capable of discharging rainwater in each inside of the upper vertical pipe (21a), the lower vertical pipe (21b) and the rainwater guide pipe (16) to the outside is provided at the lower vertical pipe (21b) or the rainwater guide pipe (16).

8. The rainwater storage device according to claim 7, wherein a check valve (41) for preventing a rainwater flow from the rainwater guide pipe (16) to the lower vertical pipe (21b) is provided at the lower end of the lower vertical pipe (21b) or the rainwater guide pipe (16).

9. A rainwater storage device comprising:
the filtration device (20) according to claim 3;
a rainwater storage tank (11) having the rainwater intake (11a) disposed above the filtration device (20); and
a rainwater guide pipe (16) with one end connected to the lower end of the lower vertical pipe (21b) and the other end connected to the rainwater intake (11a), wherein the upper end of the upper vertical pipe (21a) is disposed above the rainwater intake (11a).

10. The rainwater storage device according to claim 9, wherein a check valve (41) for preventing a rainwater flow from the rainwater guide pipe (16) to the lower vertical pipe (21b) is provided at the lower end of the lower vertical pipe (21b) or the rainwater guide pipe (16).

11. The rainwater storage device according to claim 9, wherein a drain valve (17) capable of discharging rainwater in each inside of the upper vertical pipe (21a), the lower vertical pipe (21b) and the rainwater guide pipe (16) to the outside is provided at the lower vertical pipe (21b) or the rainwater guide pipe (16).

12. The rainwater storage device according to claim 11, wherein a check valve (41) for preventing a rainwater flow from the rainwater guide pipe (16) to the lower vertical pipe (21b) is provided at the lower end of the lower vertical pipe (21b) or the rainwater guide pipe (16).

13. A rainwater storage device comprising:
the filtration device (20) according to claim 2;
a rainwater storage tank (11) having the rainwater intake (11a) disposed above the filtration device (20); and
a rainwater guide pipe (16) with one end connected to the lower end of the lower vertical pipe (21b) and the other end connected to the rainwater intake (11a), wherein the upper end of the upper vertical pipe (21a) is disposed above the rainwater intake (11a).

14. The rainwater storage device according to claim 13, wherein a check valve (41) for preventing a rainwater flow from the rainwater guide pipe (16) to the lower vertical pipe (21b) is provided at the lower end of the lower vertical pipe (21b) or the rainwater guide pipe (16).

15. The rainwater storage device according to claim 13, wherein a drain valve (17) capable of discharging rainwater in each inside of the upper vertical pipe (21a), the lower vertical pipe (21b) and the rainwater guide pipe (16) to the outside is provided at the lower vertical pipe (21b) or the rainwater guide pipe (16).

16. The rainwater storage device according to claim 15, wherein a check valve (41) for preventing a rainwater flow from the rainwater guide pipe (16) to the lower vertical pipe (21b) is provided at the lower end of the lower vertical pipe (21b) or the rainwater guide pipe (16).

17. A rainwater storage device comprising:
the filtration device (20) according to claim 1;
a rainwater storage tank (11) having the rainwater intake (11a) disposed above the filtration device (20); and
a rainwater guide pipe (16) with one end connected to the lower end of the lower vertical pipe (21b) and the other end connected to the rainwater intake (11*a*), wherein the upper end of the upper vertical pipe (21*a*) is disposed above the rainwater intake (11*a*).

18. The rainwater storage device according to claim 17, wherein a drain valve (17) capable of discharging rainwater in each inside of the upper vertical pipe (21*a*), the lower vertical pipe (21*b*) and the rainwater guide pipe (16) to the outside is provided at the lower vertical pipe (21*b*) or the rainwater guide pipe (16).

19. The rainwater storage device according to claim 17 or 18, wherein a check valve (41) for preventing a rainwater flow from the rainwater guide pipe (16) to the lower vertical pipe (21*b*) is provided at the lower end of the lower vertical pipe (21*b*) or the rainwater guide pipe (16).

\* \* \* \* \*